United States Patent
Elley et al.

(10) Patent No.: US 9,680,871 B2
(45) Date of Patent: Jun. 13, 2017

(54) ADOPTING POLICY OBJECTS FOR HOST-BASED ACCESS CONTROL

(71) Applicant: Red Hat, Inc., Raleigh, NC (US)

(72) Inventors: Yassir Elley, Natick, MA (US); Stephen Gallagher, Methuen, MA (US)

(73) Assignee: Red Hat, Inc., Raleigh, NC (US)

( * ) Notice: Subject to any disclaimer, the term of this patent is extended or adjusted under 35 U.S.C. 154(b) by 262 days.

(21) Appl. No.: 14/104,909

(22) Filed: Dec. 12, 2013

(65) Prior Publication Data

US 2015/0172318 A1 Jun. 18, 2015

(51) Int. Cl.
*H04L 29/06* (2006.01)
*G06F 21/00* (2013.01)

(52) U.S. Cl.
CPC ............. *H04L 63/20* (2013.01); *G06F 21/00* (2013.01)

(58) Field of Classification Search
CPC .......... G06F 21/60; G06F 21/53; G06F 21/52; G06F 21/6218; G06F 21/00; H04L 63/20; H04L 63/102
USPC ............................................................ 726/1
See application file for complete search history.

(56) References Cited

U.S. PATENT DOCUMENTS

| | | | |
|---|---|---|---|
| 7,496,910 B2 * | 2/2009 | Voskuil ..................... | G06F 8/65 717/168 |
| 7,865,603 B2 | 1/2011 | Braddy et al. | |
| 8,078,713 B1 | 12/2011 | Kim | |
| 8,166,554 B2 | 4/2012 | John | |
| 8,185,548 B2 * | 5/2012 | Lim .............................. | 707/781 |
| 8,417,678 B2 * | 4/2013 | Bone et al. ................... | 707/694 |
| 8,776,166 B1 * | 7/2014 | Erickson et al. ................. | 726/1 |
| 2003/0115179 A1 | 6/2003 | Prabakaran et al. | |
| 2007/0186106 A1 | 8/2007 | Ting et al. | |
| 2008/0307506 A1 * | 12/2008 | Saldhana .......................... | 726/4 |
| 2010/0050232 A1 * | 2/2010 | Peterson et al. .................. | 726/1 |
| 2011/0213966 A1 | 9/2011 | Fu et al. | |

OTHER PUBLICATIONS

Bowling, Jeramiah "Fedora Directory Server: The Evolution of Linux Authentication", Linux Journal, Sep. 2007, 9 pages.
Caballero, Albert "Cross Platform Remote Control Authentication using Directory Services and the NetOp Security Server", Sep. 23, 2004, 34 pages.
Klasen, Norbert "Directory Services for Linus in comparison with Novell NDS and Microsoft Active Directory", Department of Computer Science, Rheinisch-WestfA Lische Technische Hochschule Aachen, Germany Aug. 2001, 94 pages.

(Continued)

*Primary Examiner* — John B King
*Assistant Examiner* — Narciso Victoria
(74) *Attorney, Agent, or Firm* — Lowenstein Sandler LLP (57) ABSTRACT

A policy manager running on a client device receives policy data from a domain controller comprising a directory server and a file server. The client device runs an operating system that does not natively support policy retrieval from the directory server and file server. The policy manager identifies a policy type of the received policy data and identifies a policy processing plug-in associated with the identified policy type. The policy processing plug-in is connected to the operating system on the client device through a plug-in interface. The policy manager provides the received policy data to the identified policy processing plug-in for processing.

17 Claims, 6 Drawing Sheets

(56) References Cited

OTHER PUBLICATIONS

Jones, Brent, "Active Directory LDAP integration with RedHat/CENTOS/Scientific Linux" Technical Blog, http://www.brentrjones.com/2012/01/20/active-directory-ldap-integration-with-red hat-centos-scientific-linux/, Jan. 20, 2012, 5 pages.
Heslin, Mark, "Integrating Red Hat Enterprise Linux 6 with Active Directory", version 1.4, Feb. 2013, 126 pages.

* cited by examiner

ADOPTING POLICY OBJECTS FOR HOST-BASED ACCESS CONTROL

TECHNICAL FIELD

This disclosure relates to the field of policy retrieval and enforcement and, in particular, to adopting policy objects for host-based access control.

BACKGROUND

Policy retrieval and enforcement involves the use of a network access control system to control operations in a network. One example is the control of access to networked client machines. The criteria for whether a client machine is allowed to access the network, whether a particular user is allowed to access a given client machine, etc. are specified in a set of rules or parameters known as a policy. A policy is a set of usage rules, a set of parameters to be used by a specific authorized user, or a set of system criteria that is used to precisely define the rules that should be complied with before the system is allowed to access the network or the user is allowed to access the system. The policy may be contained in a policy description language. Policy objects typically consist of two parts: policy metadata that is stored in a directory server, and policy data that is stored in a file server. A directory server is the software system that stores, organizes and provides access to information in a directory. A file server is the software system that stores, organizes, and provides access to information in a file system. In essence, a directory is a map between names and values. In an example computing domain, the directory server and file server may be managed by a domain controller and may be accessed by various client devices in the domain. Software on the client devices can make requests of the directory server (e.g., by using the name of the client device or the identifier of an intended directory server) for the values in the directory associated with the name. Software on the client devices can also make requests of the file server (e.g. by using the identifier of an intended file server). In one example, the values in the directory server and files in the file server are associated with the policies that will be used with policy retrieval and enforcement. This set-up allows for the centralized storage of policy information which can be accessed by multiple clients, thereby preventing the need to store a copy of the policy information locally on each client device.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide an understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely examples. Particular implementations may vary from these example details and still be contemplated to be within the scope of the present invention.

Embodiments are described for adopting policy objects managed by a directory server and file server for host-based access control. The directory server, which may be managed by a domain controller, stores, organizes and provides access to information in a directory. The file server, which may be managed by a domain controller, stores, organizes, and provides access to information in a file system. The directory server and file server can be accessed by various client devices in the computing domain. When the client devices natively support policy retrieval and policy enforcement as provided by the directory server and file server (e.g., when the client devices run software designed to interact with the domain controller or software from the same developer as the directory server or file server), the retrieval of policy metadata from the directory server, and policy data from the file server, is relatively straightforward. In modern computing domains, however, client devices running software from a variety of developers may be added. These client devices may not all natively support policy retrieval and policy enforcement in the manner provided by the directory server and file server, thereby increasing the complexity of retrieving information from the directory server and file server.

For example, one commonly used directory server is Microsoft' Windows Server Active Directory. Windows based client devices may include a system daemon designed to communicate with Active Directory and may natively support the processing of policy metadata as provided by Active Directory (e.g., through the Group Policy feature). Client devices running software that is not directly compatible with the policy identification and retrieval mechanisms provided by the directory server and file server may face difficulties retrieving policy metadata from the directory server (e.g., due to differences in the security models) and retrieving policy data form the file server. For example, an open source operating system running on the client device, such as Linux or Berkeley Software Distribution (BSD), may not natively support the processing of policy metadata and policy data provided by Group Policy.

As used herein, a policy may include a set of rules or actions that are to be enforced or performed by a client system. One example of a policy is an access control policy that controls to whom, how, when and where access may be granted to a client system. For example, only certain users may be allowed to access a given client machine between certain times. Software on the client machines may identify the applicable policies from the policy metadata provided by the directory server and retrieve the actual policy data, which specifies what the policy settings are, from a corresponding file server in response to an access request and evaluate one or more conditions of the policy in order to make an access determination. Storing these policies centrally in the domain controller allows access by multiple clients, thereby preventing the need to store a copy of the information locally on each client device. There may be many other policies stored and retrieved in a similar fashion, such as policies defining what processes a given user is allowed to run, when a user should change his password for the system, etc. In addition, policies, such as the access control policies described above, are just one example of the type of information that may be provided by the directory server and file server of the domain controller.

In one example, a client device includes a policy manager which receives (e.g., in response to a request) policy metadata from a directory server. The policy manager, for example, may be a system daemon such as the System Security Services Daemon (SSSD) or some other piece of software. One function of SSSD is to provide access to identity and authentication remote resources through a common framework that can provide caching and offline support to the system. The policy manager may further retrieve the corresponding policy data from a file server associated with the domain controller. The policy manager identifies a policy type of the received policy data and identifies a policy processing plug-in associated with the identified policy type. Multiple policy processing plug-ins may be connected to the operating system on the client device through a plug-in interface and each policy processing plug-in may be specifically designed to process a different type of policy and make a resulting determination (e.g., an access control determination). The policy manager provides the retrieved policy data to the identified policy processing plug-in for processing and eventually receives the resulting determination. If no processing plug-in associated with the identified policy type is available through the plug-in interface, the policy manager may discard the received policy data.

In one example, the policy manager requests the policy data from the domain controller, which may include both the directory server that provides metadata specifying who the policies apply to and the file server that provides actual policy data specifying what the policy settings are, as part of processing an access request for the client device. For example, the policy manager may receive a request from a user to access the client device. The policy manager determines whether the user is authenticated, which may include verifying the identity of the user making the access request. For example, the user may provide a set of identification credentials, such as a user name and password combination. If the user is authenticated, the policy manager determines whether the user is authorized to access the client device by processing policy data received from the directory server and/or file server. Additional details of this user authorization stage are provided below. If the policy manager determines that the user is authorized to access the client device, the policy manager grants the user access to the client device and opens a user session on the client device.

User authorization may itself be a multi-stage process. For example, in response to receiving the user access request, the policy manager may issue a lightweight directory access protocol (LDAP) request to the directory server to determine which policies are associated with the client device. In response, the policy manager may receive metadata for the policies associated with the client device in response to the request. The received metadata may include, for example, identifiers and/or directory addresses of the policies associated with the client device. The policy manager may then send a file transfer request to the file server for the actual policy data identified in the previously received metadata. In response, the policy manager receives the policy data and interprets the policy data using an identified policy processing plug-in, as described above. In one example, the policy manager may cache the received policy data from the file server to avoid having to perform a round-trip directory access for subsequent requests.

The policy processing plug-in may output a determination, based on the policy, of whether the conditions of the policy were satisfied by the request (e.g., based on a combination of the user, the client machine, the time of the request, etc.). If the policy conditions are satisfied, the policy manager may determine that the user is authorized and open a user session on the user device.

In one example, the policy manager (SSSD) adopts the use of group policy objects stored in the Active Directory for host-based access control. These policies may be applied at boot time, at refresh, and when a computer joins a domain. In one example, SSSD recognizes a switch between offline behavior and online behavior. When a client machine is brought up online, SSSD authenticates the user and caches the user's credentials. If the machine goes offline (e.g., if server goes down or user intentionally disconnects), the credentials remain valid for a certain period of time while the user is offline. As soon as SSSD detects that the user is connecting to the server again, it can switch from the offline mode to the online mode. While offline, the user can setup a number of call back functions that take effect as soon as they go online. As to the domain joining, SSSD may consider the user to be in an offline state before they join a domain even if they are connected to the network. The policy manager uses the same mechanism (i.e., setup callbacks while offline and execute them when the machine is online) to set up group policy processing call backs which take effect when the client machine goes from offline (prejoining a domain) to online (post joining a domain). As a result, as soon as the client machine joins a domain, the call back will be executed and will retrieve appropriate global policy objects from the Active Directory and will apply the associated policies.

Figure 1:
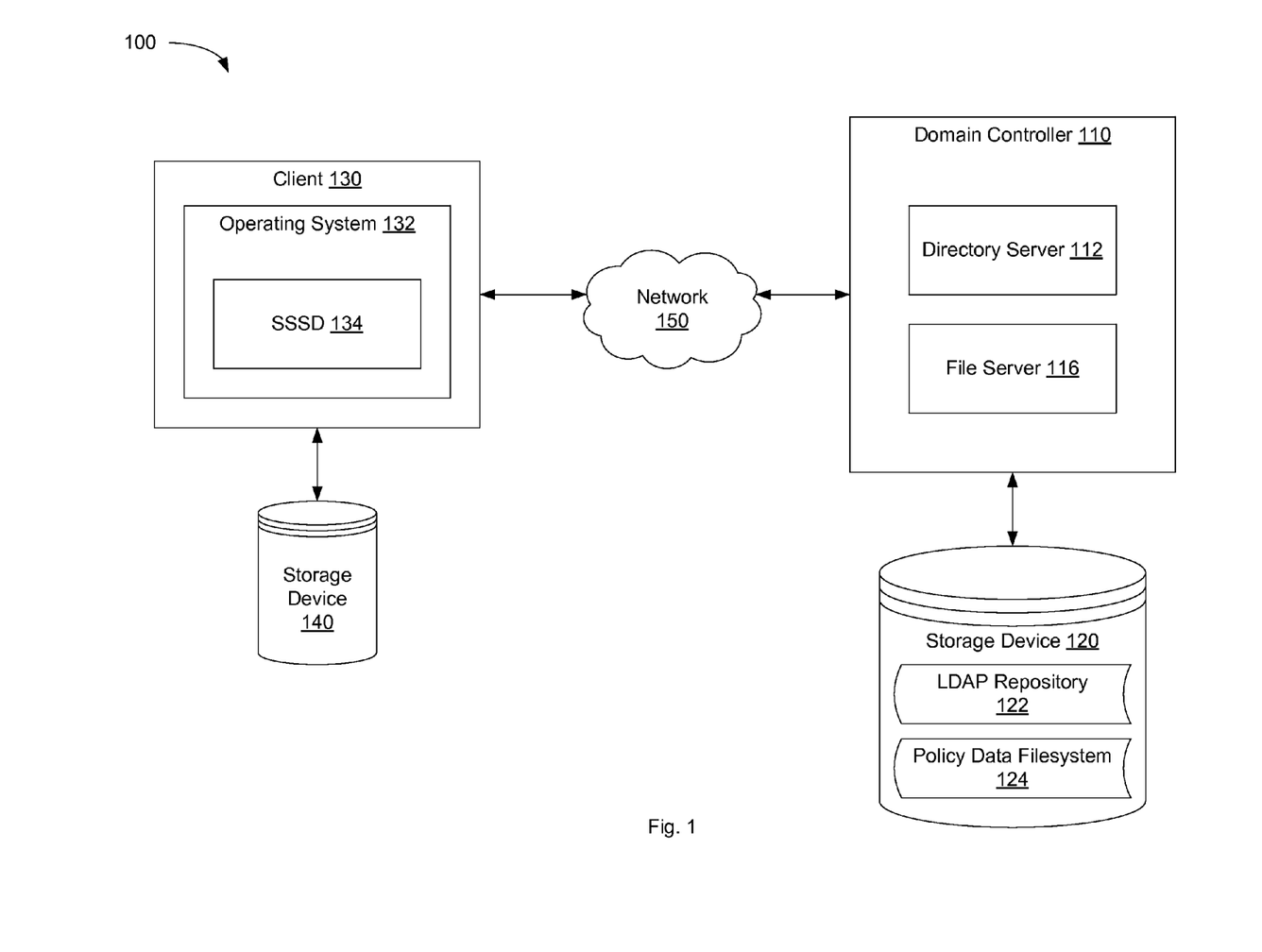
FIG. 1 is a block diagram illustrating an example network architecture in which embodiments of the present disclosure may operate.

FIG. 1 illustrates an example network architecture 100 in which embodiments of the present disclosure may operate. The network architecture 100 includes one or more domain controller computer systems 110 and one or more client computer systems 130. Domain controller 110 and client 130 may include, for example, computer system 600 of FIG. 6. Client device 130 may be any device connected to domain controller 110 through network 150, and may include for example, any computing device, client device, another server device, a user device, or some other device. Network 150 may be any type of data network configured to connect multiple computing devices, such as for example, a local area network (LAN), a wide area network (WAN), a global area network (GAN) such as the Internet, or a combination of such networks. In another example, client device 130 may have a direct connection to domain controller 110 and to any other devices in the computing environment 100. The illustrated example shows one domain controller 110 and one client device 130. In other examples, however, there may be any number of servers or networked client devices, and computing environment 100 may include additional and/or different devices.

In one example, domain controller 110 may be a server that includes a directory server 112 and file server 116. In another example, directory server 112 and file server 116 may be embodied on different physical machines. Directory server 112 may respond to security authentication requests (e.g., logging in, checking permissions, etc.) within a computing domain. In one example, the directory server 112 may be Active Directory or other LDAP directory server, and the computing domain may be a Microsoft™ Windows domain. A computing domain may be a logical construct, whereby a user can be granted access to a number of computer resources (e.g., client devices) with the use of a single username and password combination according to certain defined access policies. In one example, domain controller 110 controls the policies that govern various aspects of the computing domain. For example, domain controller 110 may manage the access control policies or other policies that are stored centrally in the directory server and file server and are used to control client machines, such as client 130, in the computing domain. In one example, domain controller 110 may include the Group Policy feature of Active Directory, or some other settings manager. Domain controller 110 may have a connected storage device 120, which stores, for example LDAP repository 122 and policy data filesystem 124.

Client device 130 may be, for example, a server, a workstation, a personal computer (PC), a mobile phone, a tablet, a hand-held computing device, a personal digital assistant (PDA), etc. Client device 130 may run an operating system 132 such as Microsoft Windows®, Linux®, Solaris®, Mac® OS, etc. In one example, however, the operations system 132 is one that does not natively support the retrieval of policy metadata by directory server 112 or the retrieval of policy data by file server 116. For example, the operating system 132 may not be specifically designed to interact with the directory server 112 or file server 116 (or may be provided by a different developer than the directory server 112 or file server 116. In one example, operating system 132 includes a policy manager which receives policy metadata from directory server 112. The policy manager, for example, may be a system daemon such as the System Security Services Daemon (SSSD) 134 or some other piece of software. One function of SSSD 134 is to provide access to identity and authentication remote resources through a common framework that can provide caching and offline support to the system. SSSD 134 identifies a policy type of the received policy data and identifies a policy processing plug-in associated with the identified policy type. Multiple policy processing plug-ins may be connected to the operating system on the client device through a plug-in interface and each policy processing plug-in may be specifically designed to process a different type of policy and make a resulting determination (e.g., an access control determination). SSSD 134 provides the received policy data to the identified policy processing plug-in for processing and eventually receives the resulting determination.

Client device 130 may have a connected storage device 140, which can be used to cache policy data or other information received from directory server 112 or file server 116. Storage device 140, as well as storage device 120 may include mass storage devices which can include, for example, flash memory, magnetic or optical disks, or tape drives, read-only memory (ROM); random-access memory (RAM); erasable programmable memory (e.g., EPROM and EEPROM); or any other types of storage medium.

Client-server systems may communicate with each other using a variety of network protocols, such as Transmission Control Protocol/Internet Protocol (TCP/IP) and Integrated Packet Exchange (IPX), and a variety of application protocols, such as Hypertext Transfer Protocol (HTTP) and File Transfer Protocol (FTP). LDAP is a networking protocol for querying and modifying directory services running over TCP/IP. An LDAP directory may contain a tree of data entries, each of which comprises a set of named attributes with values. An LDAP directory often reflects various political, geographical, and/or organizational boundaries, depending on the model chosen. An LDAP directory server may contain a server front-end, such as directory server 112) responsible for network communications, plug-ins for server functions (such as access control and replication), a basic directory tree containing server-related data, and a database back-end (such as LDAP repository 122 and policy data filesystem 124) responsible for managing the actual storage and retrieval of server data. In one example the policy metadata stored in LDAP repository 122 and the policy data stored in policy data filesystem 124 takes the form of Group Policy Objects (GPOs).

Figure 2:
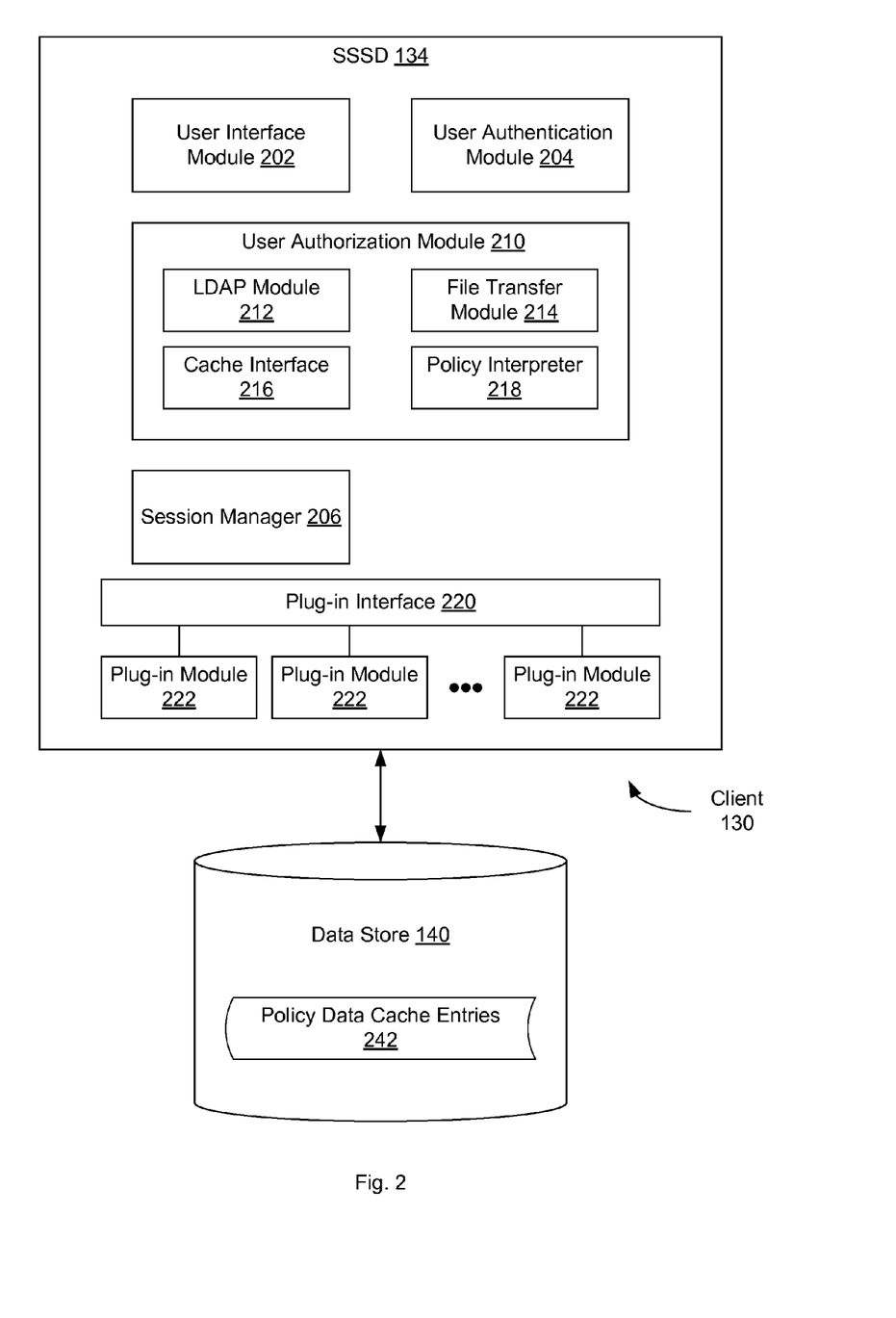
FIG. 2 is a block diagram illustrating a policy manager (e.g., System Security Services Daemon (SSSD)), according to an embodiment.

FIG. 2 is a block diagram illustrating a policy manager (e.g., System Security Services Daemon (SSSD)), according to an embodiment. In one example, SSSD 134 runs on client device 130, as shown in FIG. 1. In one example, SSSD 134 includes user interface module 202, user authentication module 204, session manager 206, user authorization module 210 and plug-in interface 220. SSSD 134 may be coupled to data store 140 which includes policy data cache entries 242. In one example, data store 140 may be the same storage device discussed above with respect to FIG. 1. In one example, client device 130 may include both SSSD 134 and data store 140. In another example, data store 140 may be external to client device 130 and may be connected to client device 130 over a network or other connection. In other examples, SSSD 134 may include different and/or additional components which are not shown to simplify the description.

In one example, user interface module 202 receives a client access request from a user. The user may be requesting access to client device 130 to perform any available processing operation. In one example, the request for access may take the form of an attempt to log-in to client device 130. User interface module 202 may display a log-in dialog window to capture the user's identification credentials. Upon receipt of the user's identification credentials (e.g., a user name and password combination), user interface module 202 may forward the identification credentials to user authentication module 204.

In one example, user authentication module 204 authenticates that the user is who they claim to be. User authentication module 204 may verify the identity of the user making the access request by confirming that user provided a valid set of identification credentials. User authentication module 204 may also verify that the user requesting access is a registered member of the computing domain. In other examples, user authentication module 204 may verify the user's identity in some other manner, such as checking for the presence of a keycard or other token, verifying a biometric characteristic (e.g., a fingerprint scan), etc.

In one example, user authorization module 210 determines whether the user authenticated by authentication module 204 is allowed to perform the requested action (e.g., access client device 130). This authorization may be determined based on one or more access control policies for the client device 130. In one example, the access control policies are identified from directory server 112 and retrieved from file server 116 on domain controller 110. In one example, a combination of sub-modules with user authorization module 210 work together to accomplish the user authorization. The sub-modules may include LDAP module 212, file transfer module 214, cache interface 216 and policy interpreter 218.

In order to initiate the user authorization, LDAP module 212 may issue an LDAP request to directory server 112 running on domain controller 110. The LDAP request may be a request for metadata corresponding to the policies associated with client machine 130. In one example, the LDAP request may include the name or other identifier of client device 130. Directory server 112 can identify the appropriate entries in LDAP repository 122, retrieve the metadata stored in those entries and return the metadata to LDAP module 212. In one example, the returned metadata may include identifiers and/or directory addresses of the actual policy data in policy data filesystem 124 that is associated with the client device 130.

In response to receiving the policy metadata, file transfer module 214 may issue a file transfer request to file server 116 for the policy data identified in the policy metadata. In one example, this request may be made using a file transfer protocol (FTP), rather than the LDAP protocol, as FTP may be more efficient than LDAP for sending the larger policy data files. Other file transfer protocols may include SMB, CIFS, etc. File server 116 can identify the appropriate entries in policy data filesystem 124, retrieve the policy data stored in those entries and return the policy data to file transfer module 214. In one example, the returned policy data may include a whitelist of authorized users, a blacklist of unauthorized users, or one or more policy conditions that may be evaluated in view of the access request to determine whether the user is authorized to access client machine 130. In one example, cache interface 216 may store a copy of the received policy data in data store 140 as policy data cache entries 242. This may prevent user authorization module 210 from having to perform a round-trip directory access for subsequent requests.

In one example, policy interpreter 218 provides the received policy data to a corresponding policy processing plug-in module 222. The policy processing plug-in module 222 may be a policy specific plug-in module designed to interpret policies of the type of the received policy. In one example, policy interpreter 218 may identify the type of policy (e.g., using the name or identifier of the policy) and determine whether an associated policy processing plug-in 222 is available. The plug-in interface 220 allows multiple policy processing plug-ins, each designed for processing a different policy type to be added to SSSD 134. For example, there may be plug-ins 222 connected to plug-in interface 220 designed to process other policy types, such as policies defining what processes a given user is allowed to run, when a user should change his password for the system, etc. The selected policy processing plug-in 222 may interpret the policy according to its defined conditions. For example, if the policy is an access control policy and the policy data includes a whitelist or a black list, policy processing plug-in 222 may compare the identifier of the user requesting access to client device 130 to the whitelist or blacklist and then either authorize or reject the access, respectively. If the policy data includes a set of policy conditions (e.g., a timeframe when access is permitted), policy processing plug-in 222 may compare the characterstics of the request (e.g., a time when the request was received) to the policy conditions to determine whether to authorize access to client device 130. Depending on the determination made by the policy processing plug-in 222, user authorization module 210 may either authorize or deny the access request.

In one example, session manager 206 opens a user session on client device 130 in response to the user being authenticated and authorized. Session manager 206 may monitor the active user session and upon time out or upon request from the user may close or otherwise terminate the user session.

Figure 3:
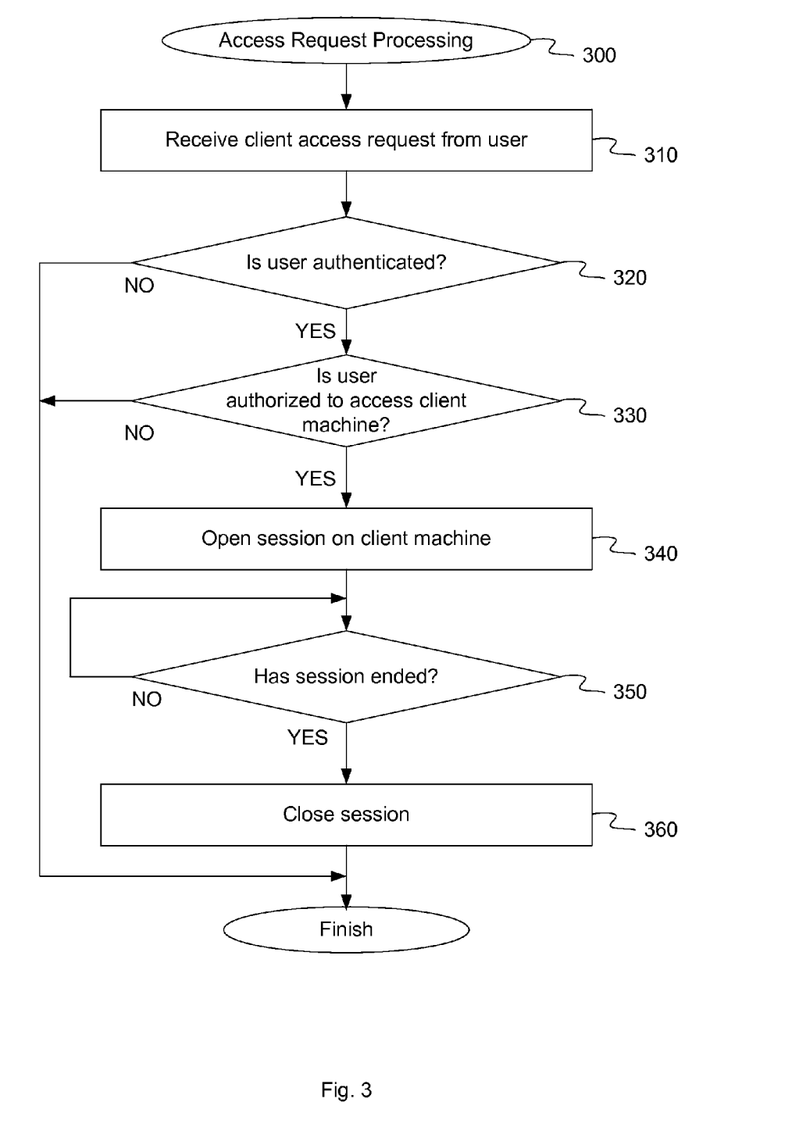
FIG. 3 is a flow diagram illustrating a method for access request processing, according to an embodiment.

FIG. 3 is a flow diagram illustrating an access request processing method, according to an embodiment. The method 300 may be performed by processing logic that comprises hardware (e.g., circuitry, dedicated logic, programmable logic, microcode, etc.), software (e.g., instructions run on a processing device to perform hardware simulation), firmware, or a combination thereof. The method 300 can process a user request to access a client machine using a directory server and file server and make a determination as to whether to allow or deny user access. In one example, method 300 may be performed by SSSD 134, as shown in FIGS. 1 and 2.

Referring to FIG. 3, at block 310, method 300 receives a client access request from a user. In one example, user interface module 202 receives a client access request from the user. The user may be requesting access to client device 130 to perform any available processing operation. In one example, the request for access may take the form of an attempt to log-in to client device 130. User interface module 202 may display a log-in dialog window to capture the user's identification credentials. Upon receipt of the user's identification credentials (e.g., a user name and password combination), user interface module 202 may forward the identification credentials to user authentication module 204.

At block 320, method 300 determines whether the user has been authenticated. In one example, user authentication module 204 authenticates that the user is who they claim to be. User authentication module 204 may verify the identity of the user making the access request by confirming that user provided a valid set of identification credentials. User authentication module 204 may also verify that the user requesting access is a registered member of the computing domain. In other examples, user authentication module 204 may verify the user's identity in some other manner, such as checking for the presence of a keycard or other token, verifying a biometric characteristic (e.g., a fingerprint scan), etc.

If method 300 determines that the user is authenticated, at block 330, method 300 determines whether the user is authorized to access the client machine. In one example, user authorization module 210 determines whether the user authenticated by authentication module 204 at block 320 is allowed to perform the requested action (e.g., access client device 130). This authorization may be determined based on one or more access control policies for the client device 130. In one example, the access control policies are retrieved from directory server 112 and file server 116 on domain controller 110. Additional details of the authorization performed at block 330 are described below with respect to FIG. 4.

If method 300 determines that the user is authorized, at block 340, method 300 opens a client session on the client machine. In one example, session manager 206 opens a user session on client device 130 in response to the user being authenticated and authorized. At block 350, method 300 determines whether the client session has ended. Session manager 206 may monitor the active user session and upon time out or upon request from the user may close or otherwise terminate the user session at block 360.

Figure 4:
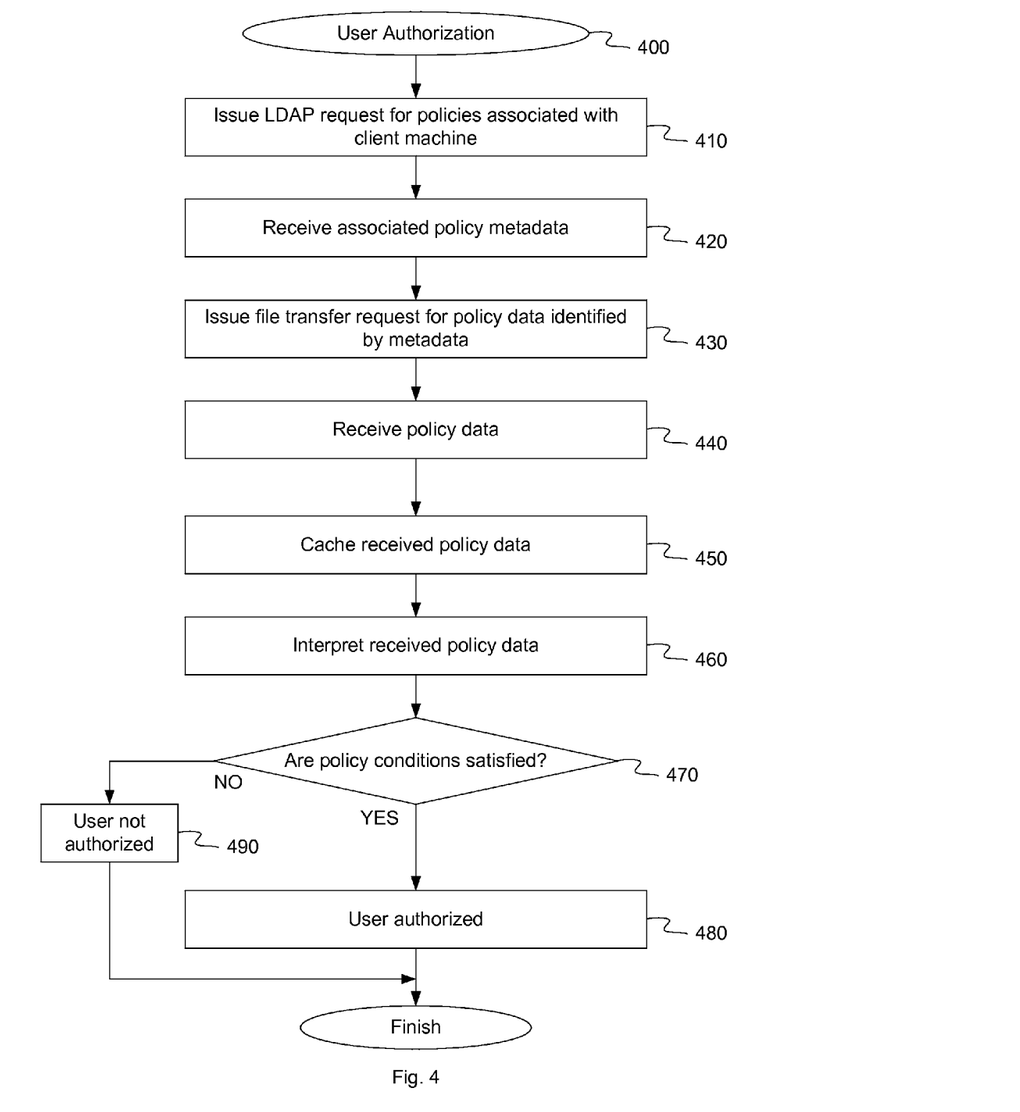
FIG. 4 is a flow diagram illustrating a method for user authorization, according to an embodiment.

FIG. 4 is a flow diagram illustrating a method for user authorization, according to an embodiment. The method 400 may be performed by processing logic that comprises hardware (e.g., circuitry, dedicated logic, programmable logic, microcode, etc.), software (e.g., instructions run on a processing device to perform hardware simulation), firmware, or a combination thereof. The method 400 can determine whether a user is authorized to perform a requested action, such as logging-in to a client machine. In one example, method 400 may be performed by user authorization module 210 of SSSD 134, as shown in FIG. 2.

Referring to FIG. 4, at block 410, method 400 issues an LDAP request for policies associated with the client machine. In order to initiate the user authorization, LDAP module 212 may issue an LDAP request to directory server 112 running on domain controller 110. The LDAP request may be a request for metadata corresponding to the policies associated with client machine 130. In one example, the LDAP request may include the name or other identifier of client device 130. Directory server 112 can identify the appropriate entries in LDAP repository 122, retrieve the metadata stored in those entries and return the metadata to LDAP module 212.

At block 420, method 400 receives the associated policy metadata. In one example, the returned metadata may include identifiers and/or directory addresses of the actual policy data in policy data filesystem 124 that is associated with the client device 130. This metadata may be received by LDAP module 212.

At block 430, method 400 issues a file transfer request for policy data identified in the metadata received at block 420. In response to receiving the policy metadata, file transfer module 214 may issue a file transfer request to file server 116 for the policy data identified in the policy metadata. In one example, this request may be made using a file transfer protocol (FTP), rather than the LDAP protocol, as FTP may be more efficient than LDAP for sending the larger policy data files. File server 116 can identify the appropriate entries in policy data filesystem 124, retrieve the policy data stored in those entries and return the policy data to file transfer module 214.

At block 440, method 400 receives the requested policy data. In one example, the returned policy data may include a whitelist of authorized users, a blacklist of unauthorized users, or one or more policy conditions that may be evaluated in view of the access request to determine whether the user is authorized to access client machine 130. This policy data may be received by file transfer module 214.

At block 450, method 400 caches the received policy data. In one example, cache interface 216 may store a copy of the received policy data in data store 140 as policy data cache entries 242. This may prevent user authorization module 210 from having to perform a round-trip directory access for subsequent requests.

At block 460, method 400 interprets the received policy data. In one example, policy interpreter 218 provides the received policy data to a corresponding policy processing plug-in module 222. The policy processing plug-in module 222 may be a policy specific plug-in module designed to interpret policies of the type of the received policy. Additional details of the policy interpretation performed at block 460 are described below with respect to FIG. 5.

At block 470, method 400 determines whether the policy conditions are satisfied. For example, if the policy is an access control policy and the policy data includes a whitelist or a black list, policy processing plug-in 222 may compare the identifier of the user requesting access to client device 130 to the whitelist or blacklist and then either authorize or reject the access, respectively. If the policy data includes a set of policy conditions (e.g., a timeframe when access is permitted), policy processing plug-in 222 may compare the characterstics of the request (e.g., a time when the request was received) to the policy conditions to determine whether to authorize access to client device 130. Depending on the determination made by the policy processing plug-in 222, user authorization module 210 may either authorize or deny the access request. If the policy conditions are satisfied, at block 480, method 400 determines that the user is authorized to access the client device. If the policy conditions are not satisfied, at block 490, method 400 determines that the user is not authorized to access the client device.

Figure 5:
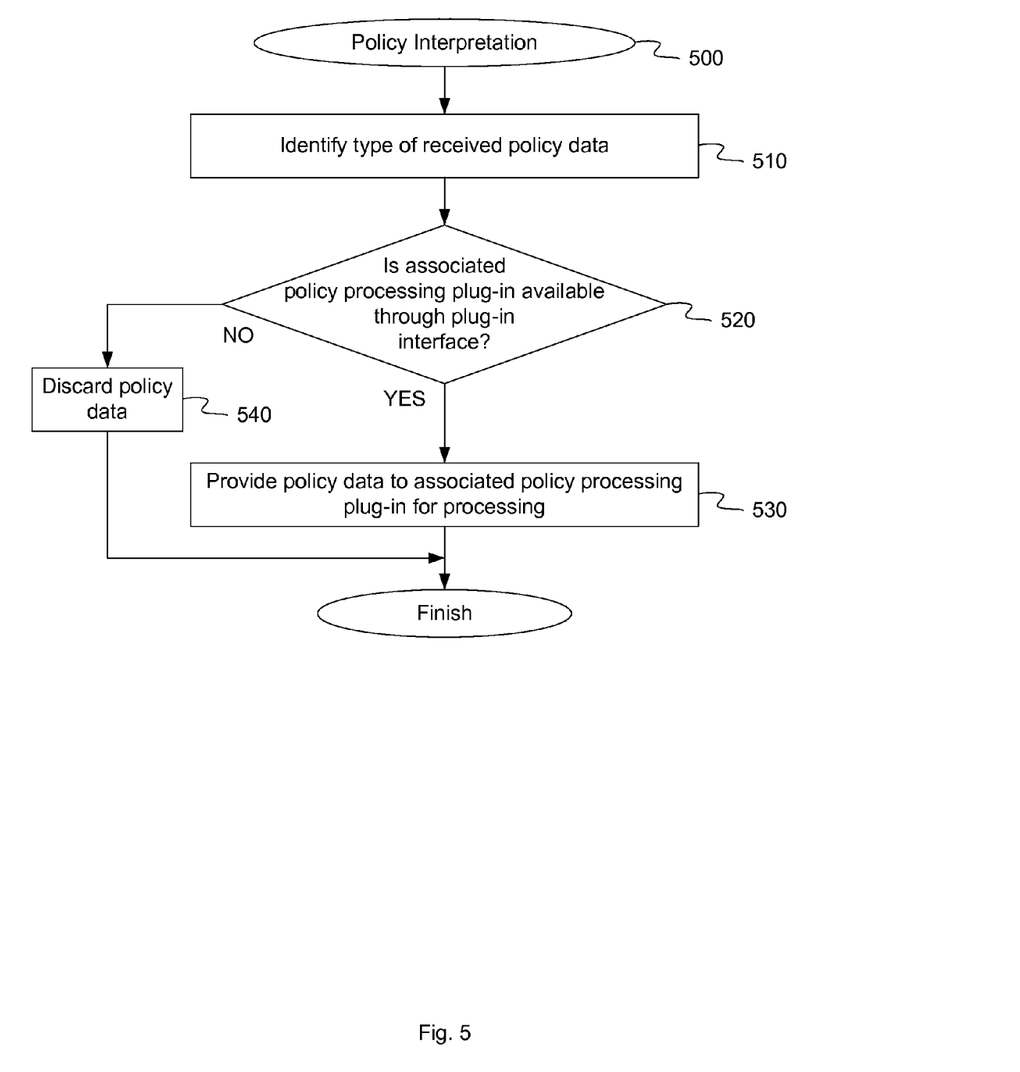
FIG. 5 is a flow diagram illustrating a method for policy interpretation, according to an embodiment.

FIG. 5 is a flow diagram illustrating a method for policy interpretation, according to an embodiment. The method 500 may be performed by processing logic that comprises hardware (e.g., circuitry, dedicated logic, programmable logic, microcode, etc.), software (e.g., instructions run on a processing device to perform hardware simulation), firmware, or a combination thereof. The method 500 can interpret, at a client device, a policy received from a directory server or file server when the client device is running an operating system that does not natively support retrieval and enforcement of policies provided by the domain controller. In one example, method 500 may be performed by SSSD 134, as shown in FIGS. 1 and 2.

Referring to FIG. 5, at block 510, method 500 identifies a policy type of the received policy data. In one example, policy interpreter 218 may identify the type of policy (e.g., using the name or identifier of the policy).

At block 520, method 500 determines whether an associated policy processing plug-in is available through a plug-in interface. Policy interpreter 218 may compare the identifier of the received policy data with the available plug-ins 222 available through plug-in interface 220. The plug-in interface 220 allows multiple policy processing plug-ins, each designed for processing a different policy type to be added to SSSD 134. For example, there may be plug-ins 222 connected to plug-in interface 220 designed to process other policy types, such as policies defining what processes a given user is allowed to run, when a user should change his password for the system, etc.

If the associated policy processing plug-in is available, at block 530, method 500 provides the policy data to the associated policy processing plug-in for processing. The selected policy processing plug-in 222 may interpret the policy according to its defined conditions. If the associated policy processing plug-in is not available, at block 540, method 500 discards the policy data.

Figure 6:
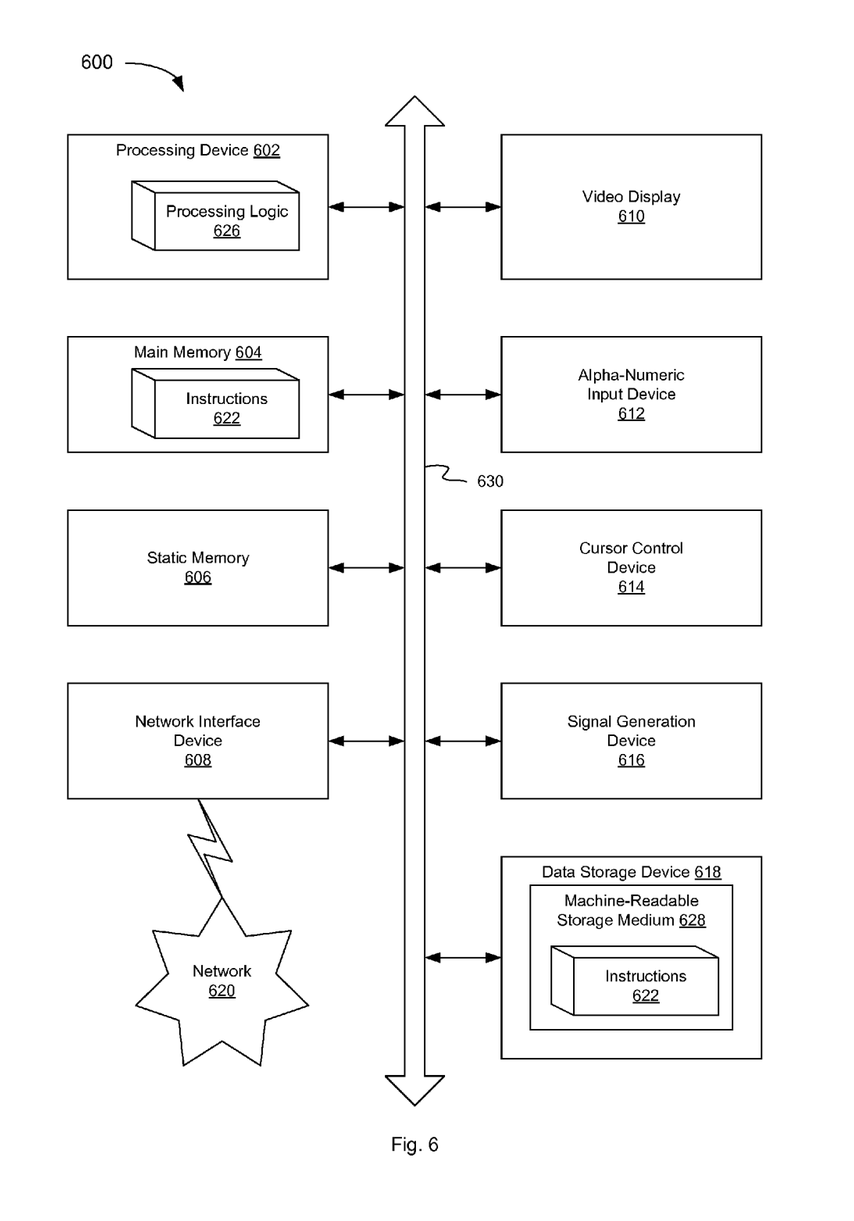
FIG. 6 is a block diagram illustrating one example of a computer system, according to an embodiment.

FIG. 6 illustrates a diagrammatic representation of a machine in the example form of a computer system 600 within which a set of instructions, for causing the machine to perform any one or more of the methodologies discussed herein, may be executed. In alternative examples, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one example, computer system 600 may be representative of domain controller 110 or client 130 running SSSD 134, as shown in FIGS. 1 and 2.

The example computer system 600 includes a processing device 602, main memory 604 (e.g., read-only memory (ROM), flash memory, dynamic random access memory (DRAM) (such as synchronous DRAM (SDRAM) or Rambus DRAM (RDRAM), etc.), static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608.

The machine-readable storage medium 628 may also be used to store instructions to perform a method for of adopting policy objects for host based access control, as described herein. While the machine-readable storage medium 628 is shown in one example to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that a certain operation may be performed, at least in part, concurrently with other operations. In another example, instructions or sub-operations of distinct operations may be in an intermittent and/or alternating manner.

What is claimed is:

1. A method comprising:
    sending, by a client device, a directory server access request to a directory server in a domain controller for a policy associated with the client device;
    receiving, at the client device, metadata for the policy associated with the client device in response to the request, the metadata to identify an address of policy data in a filesystem;
    sending, by the client device, a file transfer request to a file server managing the filesystem in the domain controller for the policy data at the address in the filesystem identified by the metadata;
    receiving, at the client device, the policy data from the domain controller, the client device running an operating system that does not natively support policy retrieval from the directory server and file server;
    identifying a policy type of the received policy data;
    identifying, by a processing device of the client device, a policy processing plug-in associated with the identified policy type from a plurality of available policy processing plug-ins, wherein each of the plurality of available policy processing plug-ins is associated with a different policy type and is connected to the operating system on the client device through a plug-in interface; and
    providing the received policy data to the identified policy processing plug-in for processing.

2. The method of claim 1, wherein the received policy comprises an access control policy for the client device.

3. The method of claim 2, further comprising:
    receiving a request from a user to access the client device;
    determining whether the user is authenticated;
    in response to the user being authenticated, determining whether the user is authorized to access the client device using the plug-in; and
    in response to the user being authorized to access the client device, granting the user access to the client device.

4. The method of claim 3, wherein determining whether the user is authorized further comprises:
    determining, by the plug-in, whether the user satisfies a condition of the received access control policy; and
    in response to the user satisfying the condition of the received access control policy, determining that the user is authorized.

5. The method of claim 1, further comprising:
    caching, at the client device, the received policy data from the domain controller.

6. The method of claim 1, further comprising:
    in response to no processing plug-in associated with the identified policy type being available through the plug-in interface, discarding the received policy data.

7. A system comprising:
a memory; and
a processing device coupled to the memory, the processing device to:
- send, by a client device, a directory server access request to a directory server in a domain controller for a policy associated with the client device;
- receive, at the client device, metadata for the policy associated with the client device in response to the request, the metadata to identify an address of policy data in a filesystem;
- send, by the client device, a file transfer request to a file server managing the filesystem in the domain controller for the policy data at the address in the filesystem identified by the metadata;
- receive, at the client device, the policy data from the domain controller, the client device running an operating system that does not natively support policy retrieval from the directory server and file server;
- identify a policy type of the received policy data;
- identify a policy processing plug-in associated with the identified policy type from a plurality of available policy processing plug-ins, wherein each of the plurality of available policy processing plug-ins is associated with a different policy type and is connected to the operating system on the client device through a plug-in interface; and
- provide the received policy data to the identified policy processing plug-in for processing.

8. The system of claim 7, wherein the received policy comprises an access control policy for the client device.

9. The system of claim 8, wherein the processing device is further to:
- receive a request from a user to access the client device;
- determine whether the user is authenticated;
- in response to the user being authenticated, determine whether the user is authorized to access the client device by processing the received policy data; and
- in response to the user being authorized to access the client device, grant the user access to the client device.

10. The system of claim 9, wherein to determine whether the user is authorized, the processing device is further to:
- determine whether the user satisfies a condition of the received access control policy; and
- in response to the user satisfying the condition of the received access control policy, determine that the user is authorized.

11. The system of claim 7, wherein the processing device is further to:
- cache, at the client device, the received policy data from the domain controller.

12. The system of claim 7, wherein the processing device is further to:
- in response to no processing plug-in associated with the identified policy type being available through the plug-in interface, discard the received policy data.

13. A non-transitory machine-readable storage medium storing instructions which, when executed, cause a processing device to:
- send, by a client device, a directory server access request to a directory server in a domain controller for a policy associated with the client device;
- receive, at the client device, metadata for the policy associated with the client device in response to the request, the metadata to identify an address of policy data in a filesystem;
- send, by the client device, a file transfer request to a file server managing the filesystem in the domain controller for the policy data at the address in the filesystem identified by the metadata;
- receiving, at the client device, the policy data from the domain controller, the client device running an operating system that does not natively support policy retrieval from the directory server and file server;
- identify a policy type of the received policy data;
- identify, by the processing device of the client device, a policy processing plug-in associated with the identified policy type from a plurality of available policy processing plug-ins, wherein each of the plurality of available policy processing plug-ins is associated with a different policy type and is connected to the operating system on the client device through a plug-in interface; and
- provide the received policy data to the identified policy processing plug-in for processing.

14. The non-transitory machine-readable storage medium of claim 13, wherein the received policy comprises an access control policy for the client device.

15. The non-transitory machine-readable storage medium of claim 14, wherein the processing device is further to:
- receive a request from a user to access the client device;
- determine whether the user is authenticated;
- in response to the user being authenticated, determine whether the user is authorized to access the client device by processing the received policy data; and
- in response to the user being authorized to access the client device, grant the user access to the client device.

16. The non-transitory machine-readable storage medium of claim 15, wherein to determine whether the user is authorized, the processing device further is to:
- determine whether the user satisfies a condition of the received access control policy; and
- in response to the user satisfying the condition of the received access control policy, determine that the user is authorized.

17. The non-transitory machine-readable storage medium of claim 13, wherein the processing device further is to:
- cache, at the client device, the received policy data from the domain controller.

* * * * *